US009973409B2

(12) United States Patent
Bastaldo-Tsampalis et al.

(10) Patent No.: US 9,973,409 B2
(45) Date of Patent: May 15, 2018

(54) ALLOCATING AND MONITORING DATA USAGE OF A USER DEVICE

(71) Applicant: Verizon Patent and Licensing Inc., Arlington, VA (US)

(72) Inventors: Brigitte Bastaldo-Tsampalis, Bridgewater, NJ (US); Yuk Lun Li, Morganville, NJ (US); Ning Zhang, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 240 days.

(21) Appl. No.: 14/948,812

(22) Filed: Nov. 23, 2015

(65) Prior Publication Data
US 2017/0149642 A1     May 25, 2017

(51) Int. Cl.
*G06F 15/16*     (2006.01)
*H04L 12/26*     (2006.01)
*G06F 3/06*      (2006.01)
*G06F 3/0482*    (2013.01)

(52) U.S. Cl.
CPC ........ H04L 43/0894 (2013.01); G06F 3/0611 (2013.01); *G06F 3/0482* (2013.01)

(58) Field of Classification Search
USPC ................................................ 709/201, 224
See application file for complete search history.

(56) References Cited

U.S. PATENT DOCUMENTS

| | | | | |
|---|---|---|---|---|
| 8,948,103 | B2* | 2/2015 | Aguirre | H04W 28/16 370/310 |
| 9,219,825 | B2* | 12/2015 | Sheikh Naziruddin | H04W 4/24 |
| 2010/0329642 | A1* | 12/2010 | Kam | G06F 3/04817 386/280 |
| 2011/0083111 | A1* | 4/2011 | Forutanpour | G06F 1/1694 715/863 |
| 2011/0191826 | A1* | 8/2011 | Ballal | H04L 63/104 726/4 |
| 2011/0275344 | A1* | 11/2011 | Momtahan | H04L 12/14 455/405 |
| 2013/0054378 | A1* | 2/2013 | Hao | G06Q 30/0241 705/14.66 |
| 2013/0312057 | A1* | 11/2013 | Dabbiere | G06F 21/60 726/1 |
| 2014/0179266 | A1* | 6/2014 | Schultz | H04W 4/24 455/406 |

* cited by examiner

*Primary Examiner* — David Lazaro
*Assistant Examiner* — Berhanu Shitayewoldetadik

(57) ABSTRACT

A device may identify an amount of data corresponding to a user device of a plurality of user devices associated with an account with a shared data amount. The amount of data may include an amount of data that is available for use by the user device and that is not available for use by other user devices of the plurality of user devices. The shared data amount may include an amount of data that is available for use by all of the plurality of user devices. The device may determine allocation information that identifies a portion of the amount of data available to the user device that is allocated for use in association with an application. The device may determine data usage information that identifies an amount of data used in association with the application. The device may determine data status information and may provide the data status information.

20 Claims, 9 Drawing Sheets

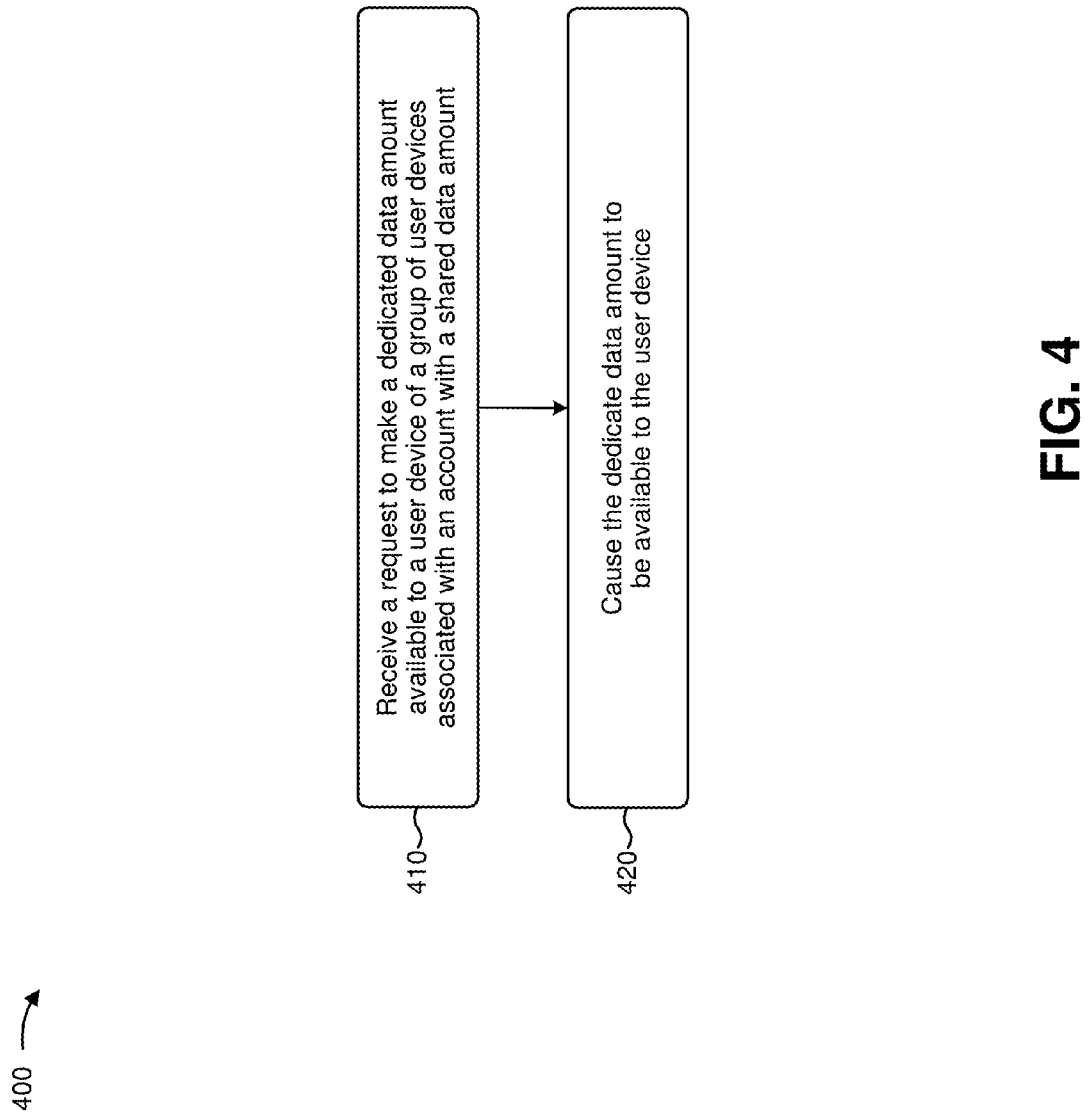

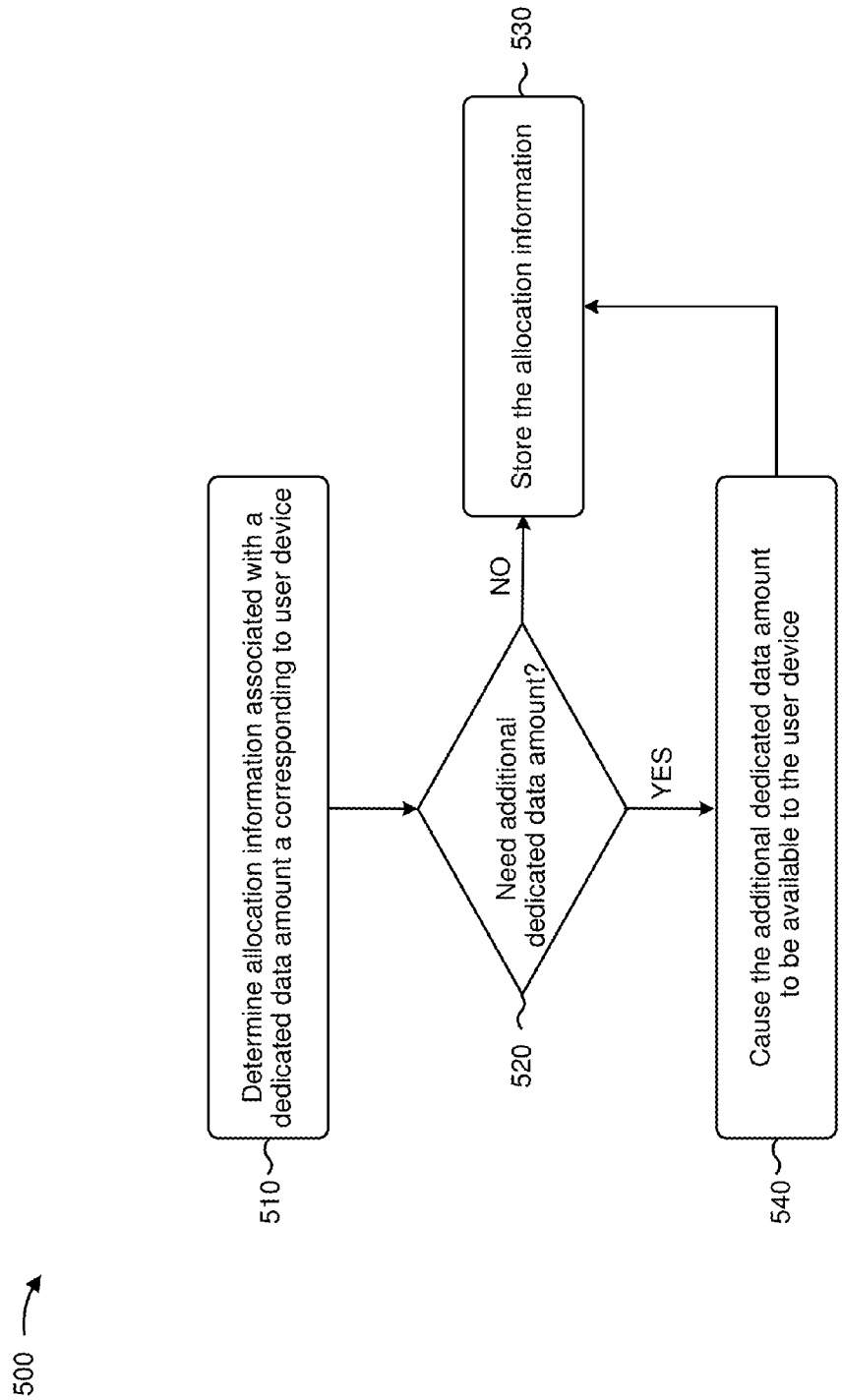

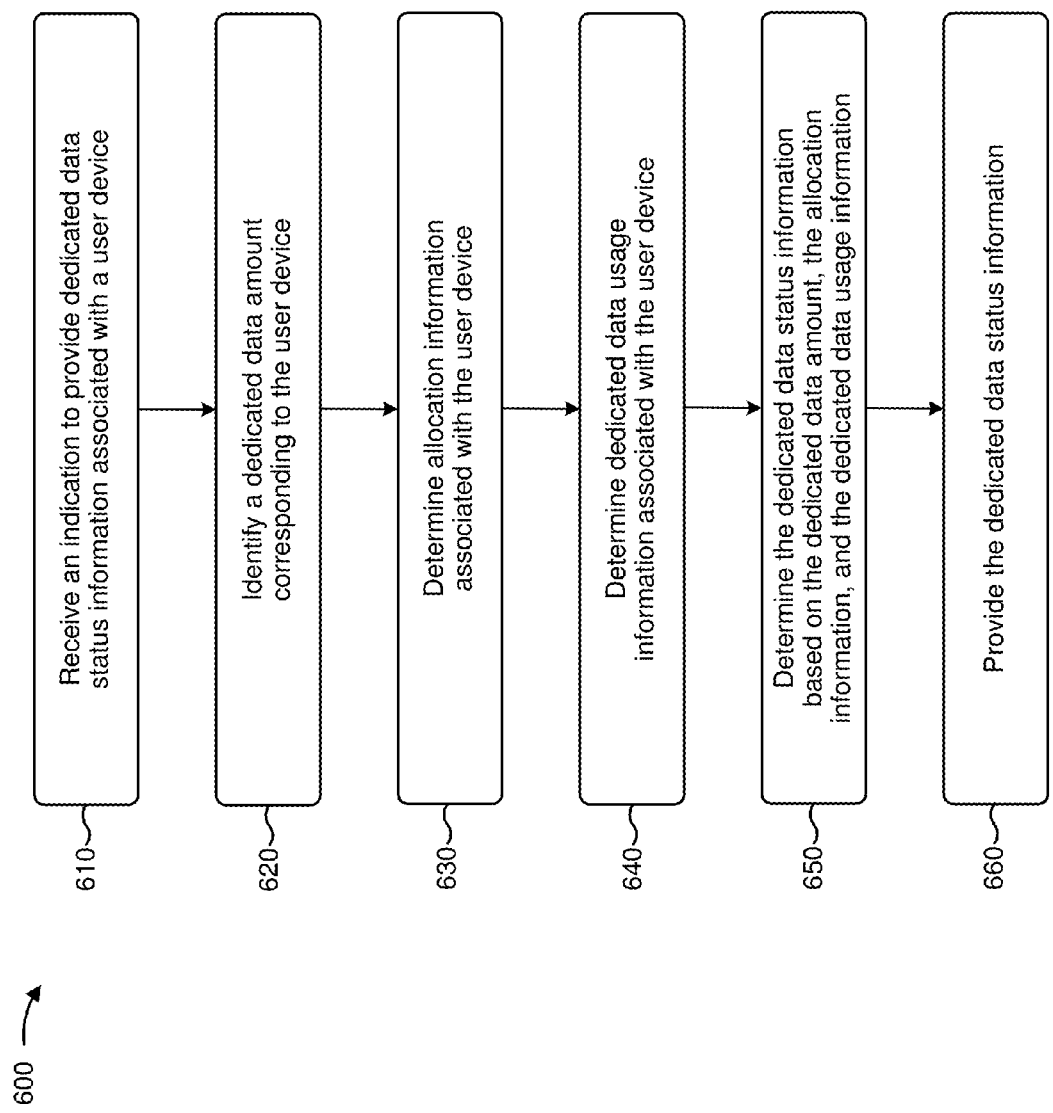

US 9,973,409 B2

ALLOCATING AND MONITORING DATA USAGE OF A USER DEVICE

BACKGROUND

A set of user devices may be associated with a service provider account that identifies a shared data amount. The service provider may permit the set of user devices to (e.g., collectively) use the shared data amount during a period of time.

BRIEF DESCRIPTION OF THE DRAWINGS

FIG. 4 is a flow chart of an example process for causing an amount of dedicated data to be available to a user device;

FIG. 5 is a flow chart of an example process for receiving allocation information associated with a dedicated data amount corresponding to a user device; and FIG. 6 is a flow chart of an example process for providing dedicated data status information associated with a user device.

DETAILED DESCRIPTION OF PREFERRED EMBODIMENTS

The following detailed description of example implementations refers to the accompanying drawings. The same reference numbers in different drawings may identify the same or similar elements.

A set of user devices may be associated with a service provider account (herein referred to as an account) that identifies an amount of data that may be used by the set of user devices when communicating via a service provider network. For example, the account may be associated with the set of user devices, and may include information indicating that the set of user devices can use a particular amount of data (e.g., 1 Gigabyte (GB), 10 GB, etc.) on a periodic basis (e.g., each week, each month, etc.). Here, data used by any user device, of the set of user devices associated with the account, may count against the particular amount of data. In other words, the set of user devices may share the particular amount of data associated with the account. As used herein, the term "shared data amount" includes an amount of data that may be used by any user device of a set of user devices associated with an account.

However, in some cases, a user of one of the user devices, associated with the account, may wish to have an additional amount of data (e.g., in excess of the shared data amount) made available to the user device. For example, the user may anticipate that data usage of the user device will be a significant portion of the shared data amount (i.e., that the shared data amount may be insufficient to cover data usage of the set of user devices), and may wish to have an additional amount of data made available. However, other users, associated with other user devices in the set of user devices, may not wish to increase the shared data amount associated with the account (e.g., due to increased monetary costs).

Implementations described herein may allow a dedicated amount of data (hereinafter referred to as a "dedicated data amount") to be made available to a user device of a set of user devices associated with an account with a shared data amount. In some implementations, the dedicated data amount may be used exclusively by the user device (e.g., rather than by all user devices of the set of user devices associated with the account, as with shared data). Implementations described herein may also allow the user device to allocate and/or monitor dedicated data usage of the user device (e.g., on a per-application and/or a per-service basis).

Figure 1A:
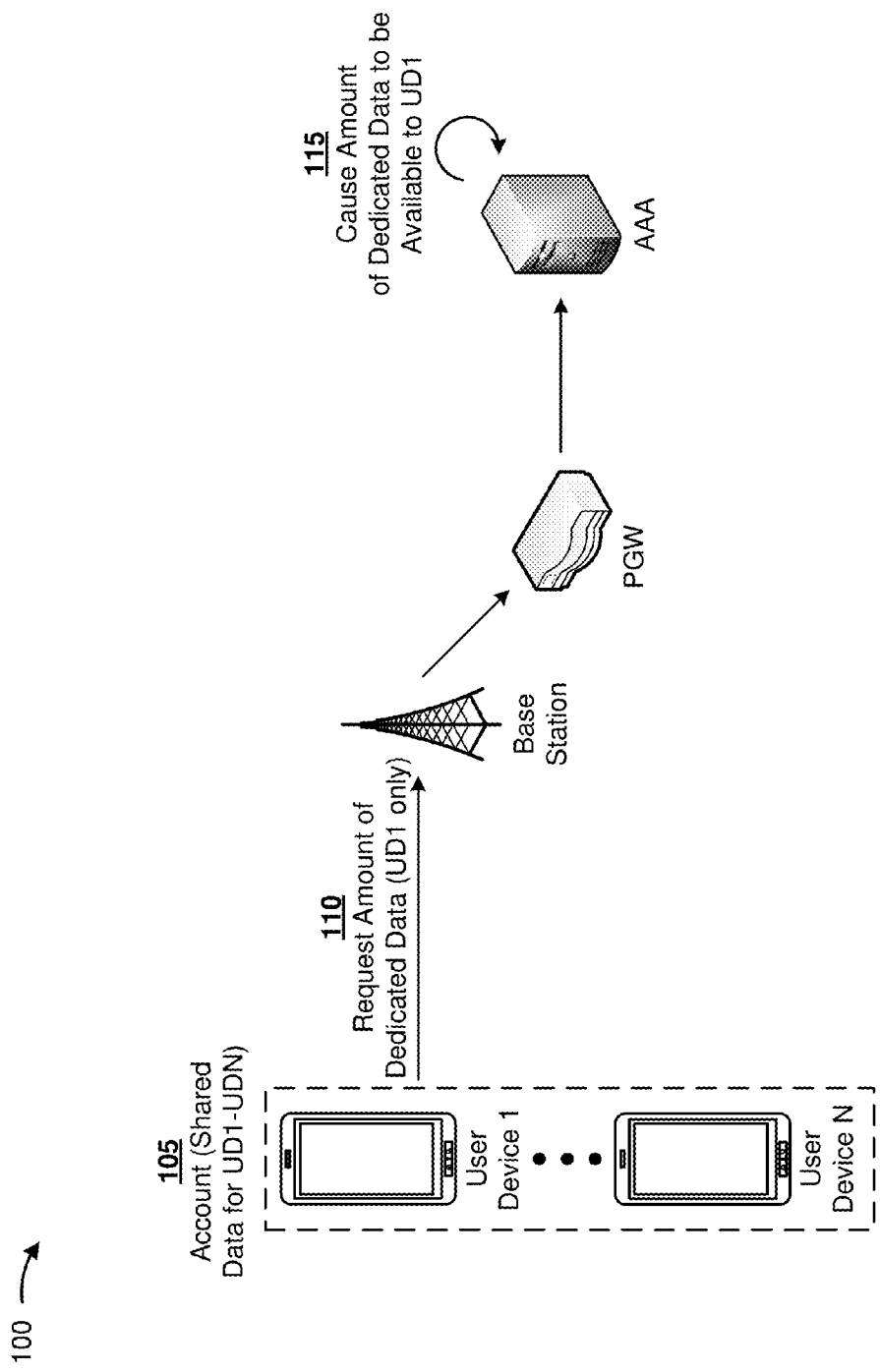
FIGS. 1A-1D are diagrams of an overview of an example implementation described herein.

FIGS. 1A-1D are diagrams of an overview of an example implementation 100 described herein. As shown in FIG. 1A, and by reference number 105, a set of user devices (e.g., user device 1 through user device N (N>1)) may be associated with an account that allows the set of user devices to share an amount of data. Here, assume that a user of user device 1 wishes to have a dedicated data amount to be made available to user device 1. The dedicated data amount may include an amount of data that may be used only by user device 1, and not by other user devices (e.g., user device 2 through user device N) associated with the account.

As shown by reference number 110, user device 1 may provide a request to make the dedicated data amount available to user device 1. For example, user device 1 may receive user input associated with the dedicated data amount to be made available to user device 1, and user device may generate and provide the request. As shown by reference number 115, an authentication, authorization, and accounting server (AAA), associated with the service provider, may receive the request, and may cause the dedicated data amount to be available to user device 1 (e.g., by triggering permission of the dedicated data amount to be used by user device 1).

Figure 1B:
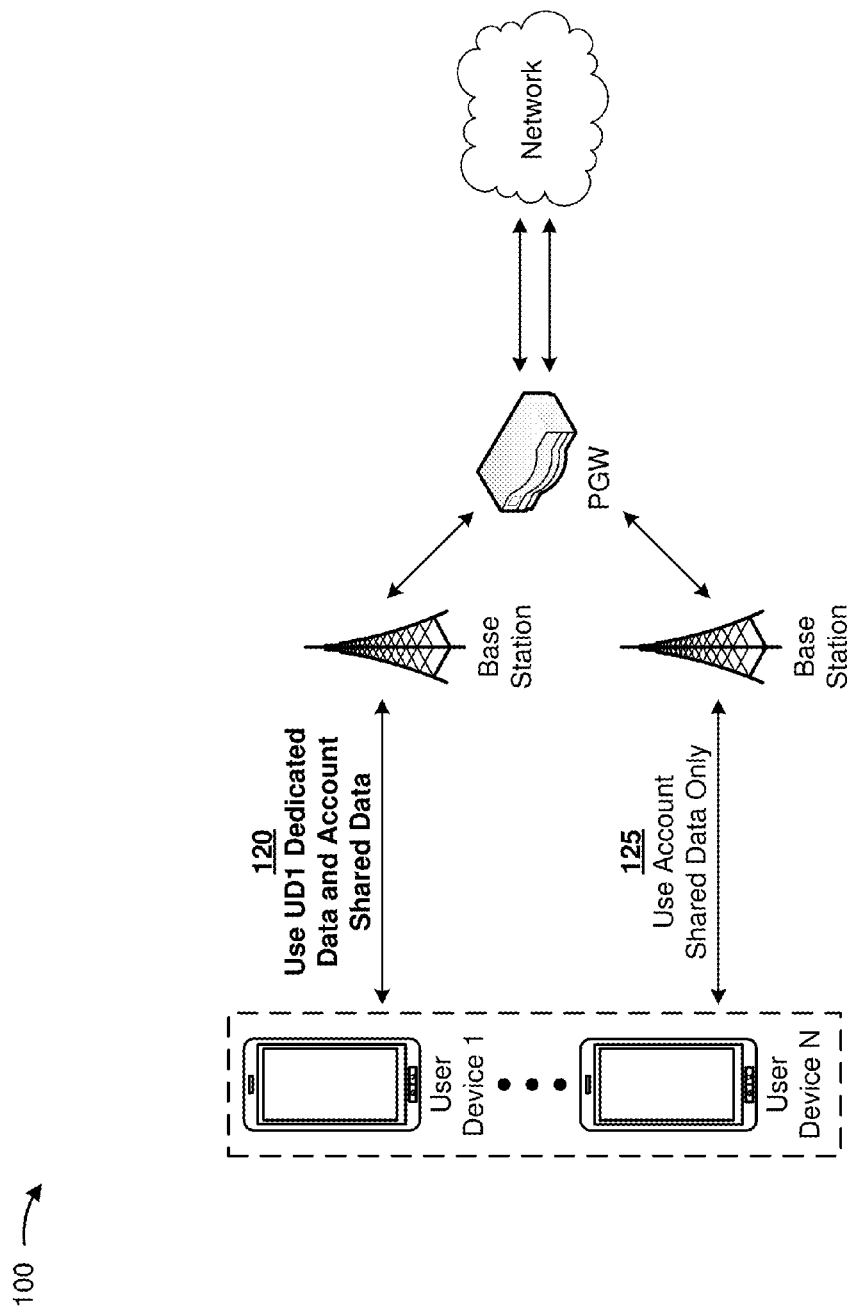

As shown in FIG. 1B, and by reference number 120, after the dedicated data amount is available to user device 1, data sent and/or received by user device 1 may count against the dedicated data amount and/or the shared data amount associated with the account. As shown by reference number 125, data sent and/or received by the other user devices associated with the account may count against the shared data amount only. In other words, the other user devices (user device 2 through user device N) may not use the dedicated data amount available to user device 1.

Figure 1C:
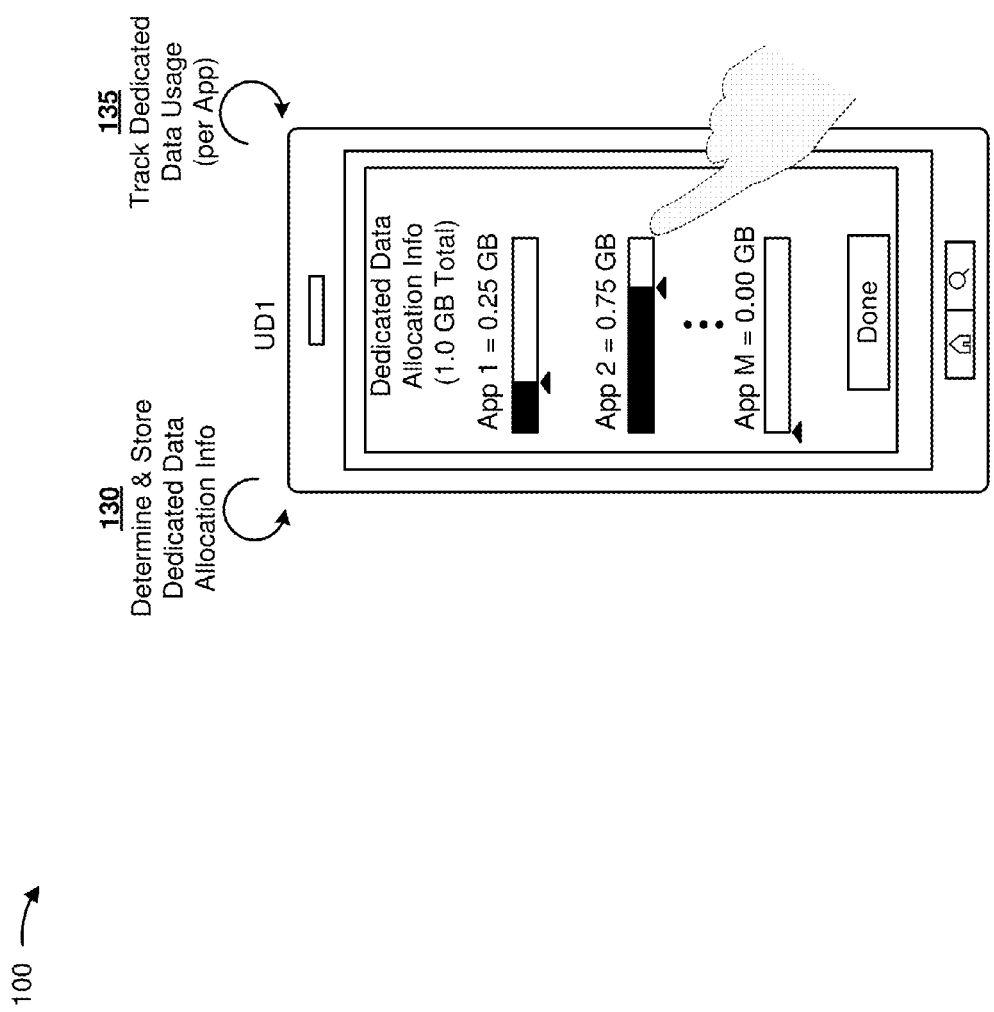

As shown in FIG. 1C, and by reference number 130, user device 1 may determine and store allocation information associated with the dedicated data amount available to user device 1. The allocation information may include information that identifies a manner in which the dedicated data amount, available to user device 1, may be used by user device 1. For example, assume that 1 GB of dedicated data is made available to user device 1 (e.g., based on the request, as described above). Here, as shown in FIG. 1C, user device 1 may (e.g., based on user input) determine allocation information indicating that a first portion of the dedicated data amount (e.g., 0.25 GB) is to be allocated for use by a first application (e.g., App 1), a second portion of the dedicated data amount (e.g., 0.75 GB) is to be allocated for use by a second application (e.g., App 2), and that no dedicated data (e.g., 0.00 GB) is to be allocated for use by a third application (e.g., App M).

As shown by reference number 135, in some implementations, user device 1 may track usage of dedicated data (e.g., for App 1 and for App 2) when, for example, user device 1 sends and/or receives data associated with the applications to which dedicated data is allocated. For example, user device 210 may track amounts of data sent and/or received in association with the first application and the second application. (e.g., since data usage associated with App 1 and App 2 counts against the dedicated data amount). In some cases, user device 210 may not track an amount of data sent and/or received in association with applications to which no dedicated data is allocated, such as the third application (e.g., (e.g., since data usage associated with App M counts against the shared data amount, rather than the dedicated data amount).

Figure 1D:
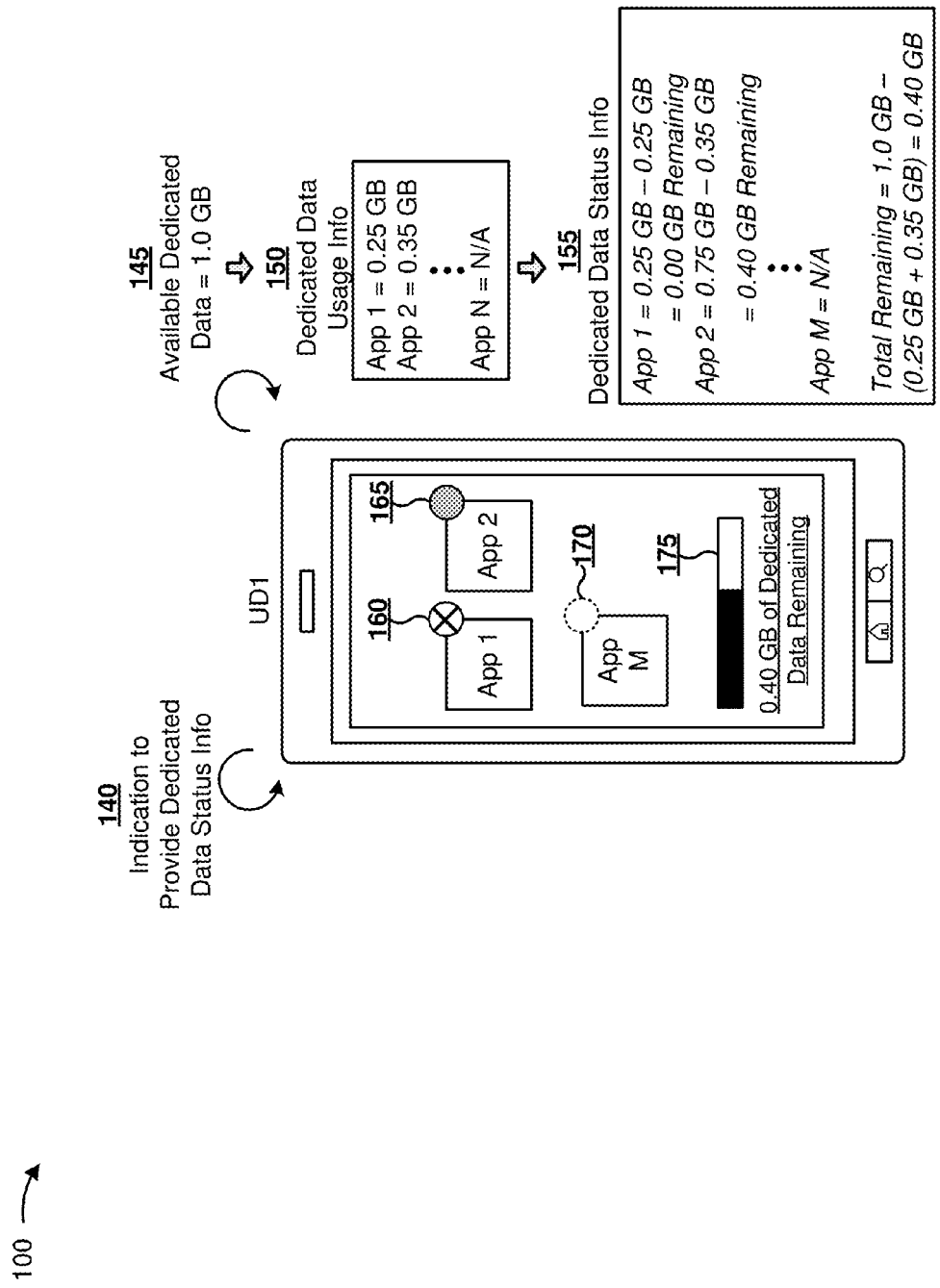

As shown in FIG. 1D, and by reference number 140, user device 1 may receive an indication to provide dedicated data status information associated with the dedicated data available to user device 1. The dedicated data status information may include information that identifies an amount of dedicated data used by user device 1 with respect to an amount of allocated dedicated data associated with user device 1 and/or to a dedicated data amount available to user device 1.

As shown by reference number 145, based on receiving the indication, user device 1 may identify (e.g., based on information stored or accessible by user device 1) the dedicated data amount available to user device 1 (e.g., 1.0 GB). As shown by reference number 150, user device 1 may determine dedicated data usage information, associated with user device 1, that identifies amounts of dedicated data used by applications to which dedicated data is allocated (e.g., App 1=0.25 GB; App 2=0.35). In some implementations, user device 1 may determine the dedicated data usage information based on tracking usage of dedicated data by user device 1, as described above.

As shown by reference number 155, user device 1 may determine the dedicated data status information based on the dedicated data amount available to user device 1, the dedicated data usage information associated with user device 1, and the allocation information associated with user device 1. For example, as shown, user device 1 may determine that user device 1 has used the allocated amount of dedicated data for sending and/or receiving data associated with the first application (e.g., App 1=0.25 GB−0.25 GB=0.00 GB remaining). As further shown, user device 1 may determine that user device 1 has used less than the allocated amount of dedicated data for sending and/or receiving data associated with the second application (e.g., App 2=0.75 GB−0.35 GB=0.40 GB remaining). As further shown, user device 1 may determine that user device 1 has used less than the dedicated data amount available to user device 1 (e.g., Total Remaining=1.0 GB−(0.25 GB+0.35 GB)−0.40 GB).

As further shown, user device 1 may provide, for display, the dedicated data status information associated with user device 1. For example, as shown by reference number 160, user device 1 may provide, for display on or near an icon associated with the first application, a symbol (e.g., a circle with an "X") to indicate that user device 1 has used the allocated amount of dedicated data for sending and/or receiving data associated with the first application. As shown by reference number 165, user device 1 may provide, for display on or near an icon associated with the second application, a symbol (e.g., a light gray circle) to indicate that user device 1 has used less than the allocated amount of dedicated data for sending and/or receiving data associated with the second application. As shown by reference number 170, user device 1 may provide, for display on or near an icon associated with the third application, a symbol (e.g., a white circle with a dashed line) to indicate that no dedicated data is allocated to the third application (i.e., that the third application will use shared data). As shown by reference number 175, user device 1 may provide, for display in a bottom portion of a screen, a usage meter to indicate the total used amount of dedicated data as compared to the dedicated data amount available to user device 1.

Notably, while example implementation 100 describes a user device as providing, for display, a symbol on or near an icon associated with an application in order to indicate data allocation and/or usage, other implementations are possible. For example, the user device may provide, for display, an outline around the icon (e.g., a colored outlined), a shaded icon, a check mark in a position associated with the icon (e.g., a position other than a top right corner of the icon), a dial in the position associated with the icon, or the like. As an additional example, the user device may provide another type of output to indicate the data allocation and/or usage, such as an audio output (e.g., playing a sound when the icon is selected), a vibration, or the like. In other words, the shape and/or form of the indication is not limited to the examples described herein.

In some implementations, user device 1 may prevent user device 1 from sending and/or receiving data associated with an application when user device 1 determines that the allocated amount of data has been used. For example, user device 1 may prevent user device 1 from sending and/or receiving data associated with the first application. Alternatively, user device may cause data sent and/or received in association with the first application to count against the shared data amount associated with the account. Additionally, or alternatively, user device 1 may allow the user to purchase an additional dedicated data amount and/or provide updated allocation information associated with the first application.

In this way, a dedicated data amount to be made available to a user device of a set of user devices associated with an account with a shared data amount (e.g., such that the dedicated data amount may be used only by the user device), and the user device may allocate and/or monitor dedicated data usage of the user device.

As indicated above, FIGS. 1A-1D are provided merely as an example. Other examples are possible and may differ from what was described with regard to FIGS. 1A-1D.

Figure 2:
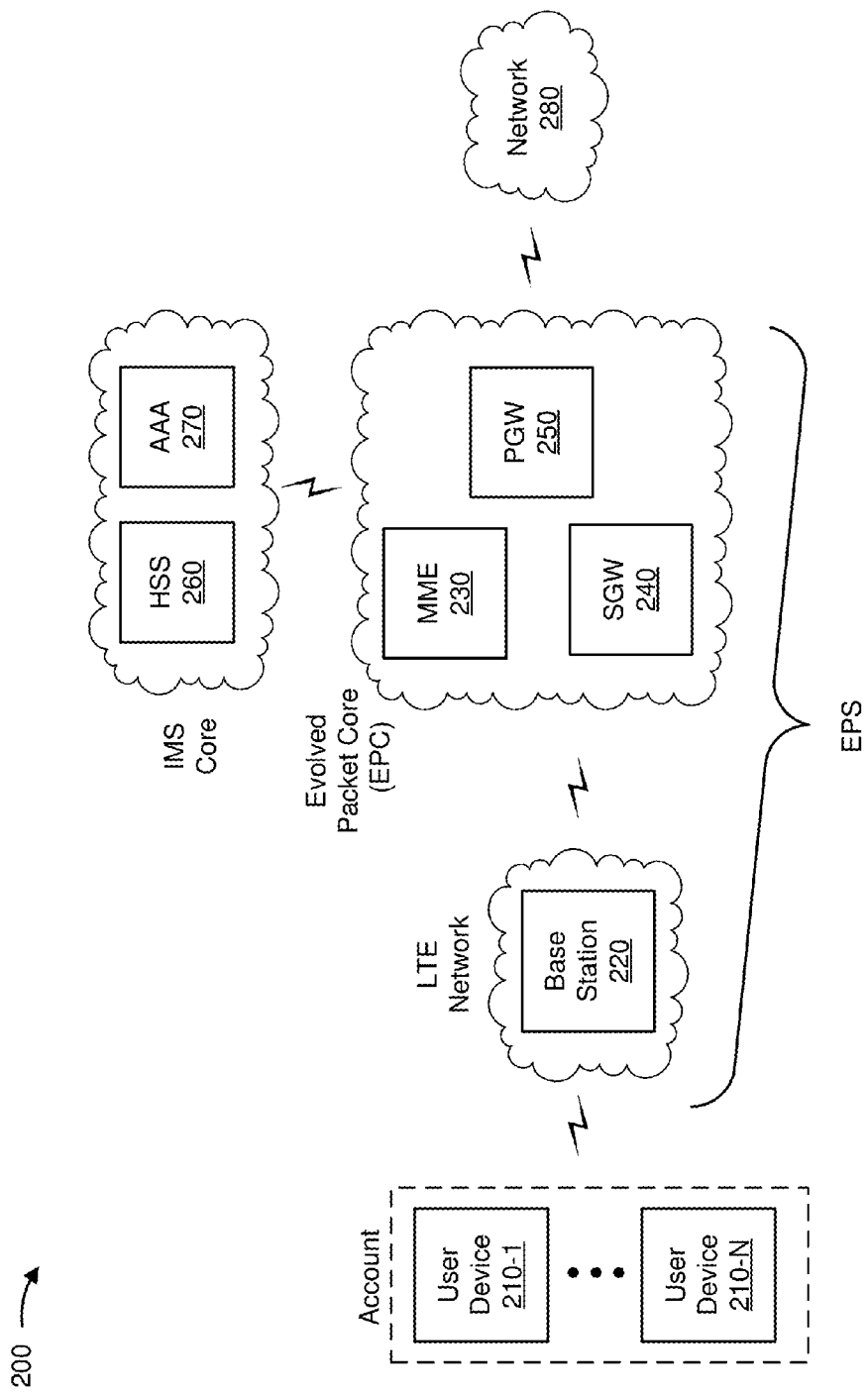
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-N (N>1) (hereinafter referred to collectively as user devices 210, and individually as user device 210) associated with an account with a shared data amount, a base station 220, a mobility management entity device (MME) 230, a serving gateway (SGW) 240, a packet data network gateway (PGW) 250, a home subscriber server (HSS) 260, an authentication, authorization, and accounting server (AAA) 270, and a network 280. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3 GPP) wireless communication standard. The LTE network may include a radio access network (RAN) that includes one or more base stations 220 that take the form of evolved Node Bs (eNBs) via which user device 210 communicates with the EPC. The EPC may include MME 230, SGW 240, and/or PGW 250 that enable user device 210 to communicate with network 280 and/or an Internet protocol (IP) multimedia subsystem (IMS) core.

The IMS core may include HSS 260 and/or AAA 270, and may manage device registration and authentication, session initiation, etc., associated with user devices 210. HSS 260 and/or AAA 270 may reside in the EPC and/or the IMS core.

User device 210 may include one or more devices capable of communicating with base station 220 and/or a network (e.g., network 280). For example, user device 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a smart wristwatch, a pair of smart eyeglasses, etc.) and/or a similar device. User device 210 may send traffic to and/or receive traffic from network 280 (e.g., via base station 220, SGW 240, and/or PGW 250).

Base station 220 may include one or more devices capable of transferring traffic, such as audio, video, text, and/or other traffic, destined for and/or received from user device 210. In some implementations, base station 220 may include an eNB associated with the LTE network that receives traffic from and/or sends traffic to network 280 via SGW 240 and/or PGW 250. Additionally, or alternatively, one or more base stations 220 may be associated with a RAN that is not associated with the LTE network. Base station 220 may send traffic to and/or receive traffic from user device 210 via an air interface. In some implementations, base station 220 may include a small cell base station, such as a base station of a microcell, a picocell, and/or a femtocell.

MME 230 may include one or more devices, such as one or more server devices, capable of managing authentication, activation, deactivation, and/or mobility functions associated with user device 210. In some implementations, MME 230 may perform operations relating to authentication of user device 210. Additionally, or alternatively, MME 230 may facilitate the selection of a particular SGW 240 and/or a particular PGW 250 to serve traffic to and/or from user device 210. MME 230 may perform operations associated with handing off user device 210 from a first base station 220 to a second base station 220 when user device 210 is transitioning from a first cell associated with the first base station 220 to a second cell associated with the second base station 220. Additionally, or alternatively, MME 230 may select another MME (not pictured), to which user device 210 should be handed off (e.g., when user device 210 moves out of range of MME 230).

SGW 240 may include one or more devices capable of routing packets. For example, SGW 240 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 240 may aggregate traffic received from one or more base stations 220 associated with the LTE network, and may send the aggregated traffic to network 280 (e.g., via PGW 250) and/or other network devices associated with the EPC and/or the IMS core. SGW 240 may also receive traffic from network 280 and/or other network devices, and may send the received traffic to user device 210 via base station 220. Additionally, or alternatively, SGW 240 may perform operations associated with handing off user device 210 to and/or from an LTE network.

PGW 250 may include one or more devices capable of providing connectivity for user device 210 to external packet data networks (e.g., other than the depicted EPC and/or LTE network). For example, PGW 250 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 250 may aggregate traffic received from one or more SGWs 240, and may send the aggregated traffic to network 280. Additionally, or alternatively, PGW 250 may receive traffic from network 280, and may send the traffic to user device 210 via SGW 240 and base station 220. PGW 250 may record data usage information (e.g., byte usage), and may provide the data usage information to AAA 270.

HSS 260 may include one or more devices, such as one or more server devices, capable of managing (e.g., receiving, generating, storing, processing, and/or providing) information associated with user device 210. For example, HSS 260 may manage subscription information associated with user device 210, such as information that identifies a subscriber profile of a user associated with user device 210, an account type associated with a user of user device 210, information that identifies services and/or applications that are accessible to user device 210, location information associated with user device 210, a network identifier (e.g., a network address) that identifies user device 210, information that identifies a treatment of user device 210 (e.g., quality of service information, a quantity of minutes allowed per time period, a quantity of data consumption allowed per time period, etc.), and/or similar information. HSS 260 may provide this information to one or more other devices of environment 200 to support the operations performed by those devices.

AAA 270 may include one or more devices, such as one or more server devices, that perform authentication, authorization, and/or accounting operations for communication sessions associated with user device 210. For example, AAA 270 may perform authentication operations for user device 210 and/or a user of user device 210 (e.g., using one or more credentials), may control access, by user device 210, to a service and/or an application (e.g., based on one or more restrictions, such as time-of-day restrictions, location restrictions, single or multiple access restrictions, read/write restrictions, data usage restrictions, etc.), may track resources consumed by user device 210 (e.g., a quantity of voice minutes consumed, a quantity of data consumed, etc.), and/or may perform similar operations.

In some implementations, AAA 270 may cause a shared data amount to be made available to user devices 210 associated with an account. Additionally, or alternatively, AAA 270 may cause a dedicated data amount to be made available to a particular user device 210 associated with the account (e.g., such that only the particular user device 210 may use the dedicated data amount). In some implementations, AAA 270 may be capable of managing and/or monitoring shared data usage and/or dedicated data usage.

Network 280 may include one or more wired and/or wireless networks. For example, network 280 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
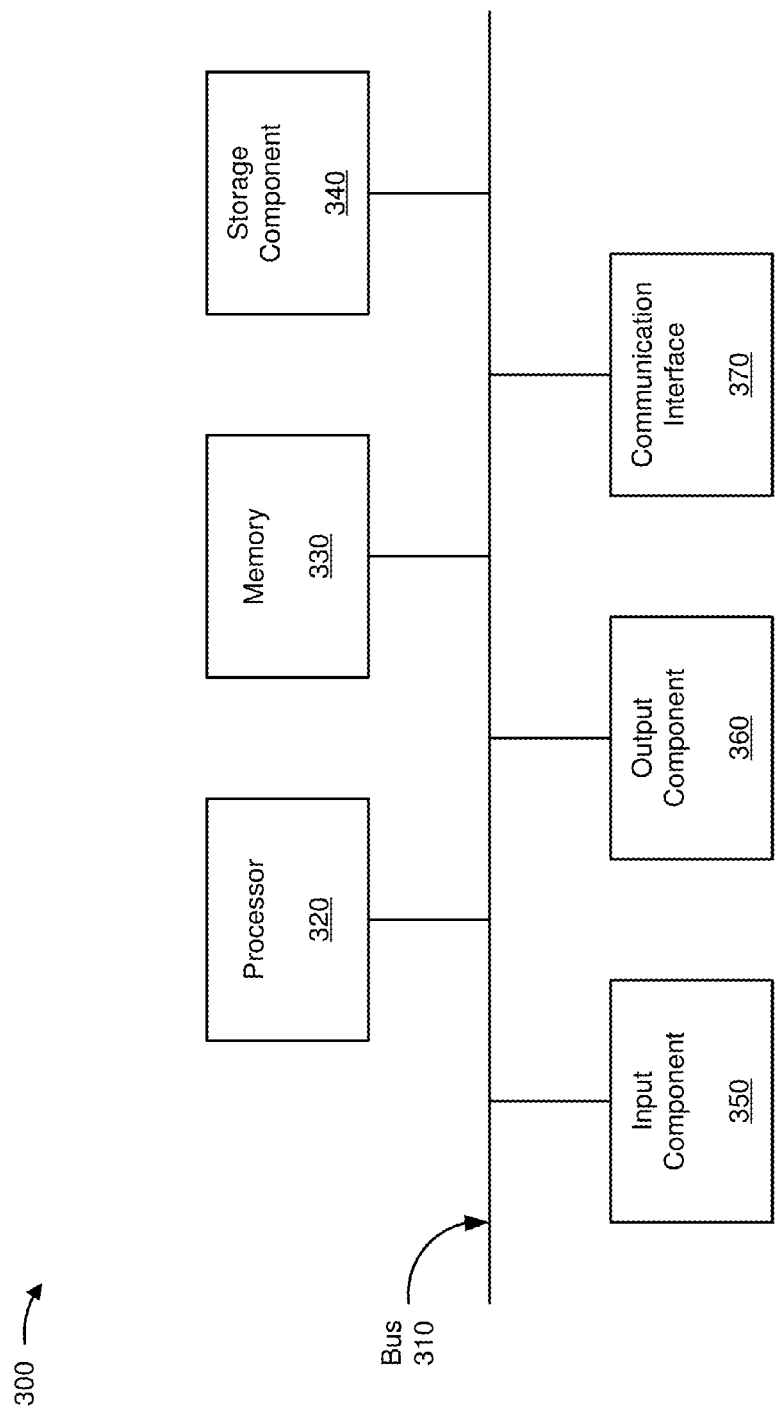
FIG. 3 is a diagram of example components of one or more devices of FIG. 2.

FIG. 3 is a diagram of example components of a device 300. Device 300 may correspond to user device 210, base station 220, MME 230, SGW 240, PGW 250, HSS 260, and/or AAA 270. In some implementations, user device 210, base station 220, MME 230, SGW 240, PGW 250, HSS 260, and/or AAA 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for causing a dedicated data amount to be available to a user device. In some implementations, one or more process blocks of FIG. 4 may be performed by AAA 270. In some implementations, one or more process blocks of FIG. 4 may be performed by another device or a set of devices separate from or including AAA 270, such as user device 210 and/or one or more other devices of environment 200.

As shown in FIG. 4, process 400 may include receiving a request to make a dedicated data amount available to a user device of a set of user devices associated with an account with a shared data amount (block 410). For example, AAA 270 may receive a request to make a dedicated data amount available to user device 210 of a set of user devices 210 associated with an account with a shared data amount. In some implementations, AAA 270 may receive the request when another device provides the request, such as user device 210.

The dedicated data amount may include an amount of data that may be used by a particular user device 210 of a set of user devices associated with an account (e.g., a service provider account). For example, the dedicated data amount may include a particular amount of data (e.g., 1 Gigabyte (GB), 10 GB, etc.) that the particular user device 210 may use (e.g., on a periodic basis, until the amount of data is used, etc.). In some implementations, the dedicated data amount may be used only by the particular user device 210. In other words, other user devices 210, associated with the account, may not use the dedicated data amount even though the particular user device 210 and the other user devices 210 are associated with the same account. Alternatively, the dedicated data amount may be made available to a subset of user devices 210 (i.e., two or more user devices 210 but fewer than all user devices 210) associated with the account.

As an example, an account may be associated with a first user device 210 and a second user device 210, and may identify a shared data amount (e.g., 5 GB/month). Here, the account may also identify a dedicated data amount (e.g., 1 GB/month) associated with the first user device 210. In this example, data used by the second user device 210 may count against the shared data amount associated with the first user device 210 and the second user device 210, while data used by the first user device 210 may count against the shared data amount or the dedicated data amount. In other words, the first user device 210 may be permitted to use an amount of data (i.e., the dedicated data amount) that is not available to the second user device 210, even though the first user device 210 and the second user device 210 are associated with a same account.

In some implementations, the request may include information associated with causing the dedicated data amount to be made available to user device 210. For example, the request may include information that identifies user device 210 to which the dedicated data amount is to be made available (e.g., a mobile directory number (MDN), an international mobile subscriber identity (IMSI), etc.), information that identifies the account associated with user device 210 (e.g., an account number, an account name, etc.), information that identifies the user of user device 210 (e.g., a first and last name, a username, a user identification number, etc.), information that identifies the dedicated data amount (e.g., a one-time use of 1 GB, 1 GB/month, 15 GB/year, etc.), or the like.

In some implementations, AAA 270 may receive the request based on user input. For example, user device 210 may provide, for display, one or more user interfaces associated with purchasing a dedicated data amount and/or otherwise causing a dedicated data amount to be made available to user device 210. Here, user device 210 may provide the request to AAA 270 based on receiving the user input via the one or more user interfaces.

In some implementations, the one or more user interfaces may include information associated with one or more dedicated data options and one or more corresponding costs (e.g., a one-time purchase of 0.5 GB of dedicated data for $5.00, 0.5 GB/month of dedicated data for $4.00/month, 20 GB/year of dedicated data for $40.00/year, etc.).

Additionally, or alternatively, the one or more user interfaces may include information associated with a dedicated data promotion associated with the service provider (e.g., "double dedicated data purchased for free—expires today," "2 GB of dedicated data for $10.00—expires in one week," etc.). In some implementations, user device 210 may receive information associated with the dedicated data promotion from AAA 270 or another device associated with the service provider.

Additionally, or alternatively, the one or more user interfaces may include information associated with sponsored dedicated data (e.g., "one free month of dedicated data for use with a Facepage application," "one week of free dedicated data for use with a voice over IP service," etc.). The sponsored dedicated data may include dedicated data that may be used for a particular purpose, such as for use by a particular application, for use by a particular service, or the like. In other words, the sponsored dedicated data may be made available to user device 210 (e.g., without a cost to the user), but user device 210 may use the sponsored dedicated data only for the particular purpose associated with the sponsored dedicated data. In some implementations, user device 210 may receive information associated with the sponsored dedicated data from AAA 270, another device associated with the service provider, and/or a device associated with the particular purpose (e.g., an application server, a device associated with providing a service, etc.).

In some implementations, user device 210 may receive the information associated with the request based on user input. For example, user device 210 may receive user input via the one or more user interfaces (e.g., described above) based on, for example, a user interaction with input elements (e.g., buttons, text boxes, drop-down menus, etc.) of the one or more user interfaces.

Additionally, or alternatively, user device 210 may determine the information associated with the request (e.g., automatically) based on information stored or accessible by user device 210. For example, user device 210 may store information that identifies the MDN associated with user device 210, a username associated with the user, or the like, and may determine the information based on the stored information.

In some implementations, user device 210 may receive payment information associated with the dedicated data amount, such as an indication that the dedicated data purchase is to be added to a service provider bill, credit card information associated with the dedicated data purchase, an indication to process payment via a particular application (e.g., Google Wallet, PayPal, etc.), or the like.

In some implementations, user device 210 may receive the information associated with the request, and may generate and provide the request to AAA 270. AAA 270 may receive the request, and may cause the dedicated data amount to be available to the user device 210, as described below.

As further shown in FIG. 4, process 400 may include causing the dedicated data amount to be available to the user device (block 420). For example, AAA 270 may cause the dedicated data amount to be available to user device 210. In some implementations, AAA 270 may cause the dedicated data amount to be available to user device 210 when AAA 270 receives the request provided by user device 210.

In some implementations, AAA 270 may cause the dedicated data amount to be available to user device 210 based on storing the information associated with the request. For example, AAA 270 may store information associated with the request such that AAA 270, when performing authentication operations for user device 210, controlling access by user device 210, tracking resources consumed by user device 210, or the like, permits user device 210 to use the dedicated data amount in accordance with the request. In other words, AAA 270 may receive the request, and may process the request such that user device 210 is permitted to use the dedicated data amount (e.g., in addition to shared data associated with the account corresponding to user device 210). In some implementations, AAA 270 may cause the dedicated data amount to be available based on providing instructions to one or more other devices, such as SGW 240, PGW 250, user device 210, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for receiving allocation information associated with a dedicated data amount corresponding to a user device. In some implementations, one or more process blocks of FIG. 5 may be performed by user device 210. In some implementations, one or more process blocks of FIG. 5 may be performed by another device or a set of devices separate from or including user device 210, such as AAA 270 and/or one or more other devices of environment 200.

As shown in FIG. 5, process 500 may include determining allocation information associated with a dedicated data amount corresponding to a user device (block 510). For example, user device 210 may determine allocation information associated with a dedicated data amount corresponding to user device 210. In some implementations, user device 210 may determine the allocation information when a user provides input associated with the allocation information. Additionally, or alternatively, user device 210 may determine the allocation information when another device provides the allocation information, such as AAA 270, a device associated with a sponsor of sponsored data, or the like.

The allocation information may include information that identifies a manner in which a dedicated data amount, available to user device 210, may be used by user device 210. For example, the allocation information may include information that identifies a first application to which a first portion of the dedicated data amount is to be allocated, a set of applications (e.g., a set of social media applications, a set of multimedia applications, a set of user-specified applications, etc.) to which a second portion of the dedicated data amount is to be allocated, information that identifies a third application to which no dedicated data is to be allocated, information that identifies a service to which a third portion of the dedicated data amount is to be allocated, or the like.

In some implementations, user device 210 may determine the allocation information based on user input. For example, user device 210 may provide, for display, a user interface associated with allocating the dedicated data amount. The user interface may include (e.g., automatically, based on a user selection from a list, etc.) information that identifies one or more applications and/or services (e.g., installed on or accessible by user device 210) and one or more input elements (e.g., sliders, text boxes, buttons, drop-down menus, etc.) corresponding to the one or more applications and/or services. Here, the user may provide, via the one or more input elements, the allocation information associated with the one or more applications and/or services, and user device 210 may determine the allocation information based on the user input. For example, user device 210 may determine the allocation information, associated with the one or more applications and/or services, based on user interactions with input elements corresponding to the one or more applications and/or services. Additionally, or alternatively, user device 210 may determine the allocation information based on a configuration of user device 210 (e.g., default allocation information stored by user device 210) and/or information provided by another device, such as AAA 270, a device associated with a sponsor of sponsored data, or the like.

In some implementations, user device 210 may track a total amount of allocated dedicated data based on the allocation information. For example, user device 210 may determine allocation information indicating that a first portion of the dedicated data amount is to be allocated to a first application and information indicating that a second portion of the dedicated data amount is to be allocated to a second application. Here, user device 210 may total (e.g., by adding) the first portion and the second portion in order to determine the total amount of allocated dedicated data. In some implementations, user device 210 may provide, for display, information that identifies the total dedicated data amount (e.g., in real-time, as the user provides input, etc.). Additionally, or alternatively, user device 210 may provide, for display, information that identifies a remaining dedicated data amount that may be allocated (e.g., based on subtracting the total amount of allocated dedicated data from the dedicated data amount available to user device 210). In some implementations, the allocation information may not specify allocation for the entire dedicated data amount. For example, the user may provide allocation information that allocates a first portion of the dedicated data amount (e.g., 60%) for use by a first application and a second portion of the dedicated data amount (e.g., 30%) for use by a second application. Here, a (remaining) third portion of the dedicated data amount (e.g., 10%) may be used for any other application and/or service and/or may not be used until allocated by the user.

In some implementations, user device 210 may determine that the total amount of allocated dedicated data satisfies an allocation threshold of the dedicated data amount available to user device 210 (e.g., is within a particular amount, is equal to, exceeds, etc.) and user device 210 may provide a notification (e.g., a warning, an alert, etc.) for display to the user. Additionally, or alternatively, based on determining that the total amount of allocated dedicated data satisfies the allocation threshold, user device 210 may determine whether an additional dedicated data amount is to be made available to user device 210, as described below.

As further shown in FIG. 5, process 500 may include determining, based on the allocation information, whether an additional dedicated data amount is needed (block 520). For example, user device 210 may determine, based on the allocation information, whether an additional dedicated data amount (i.e., a dedicated data amount in addition to the amount already available to user device 210) is needed. In some implementations, user device 210 may determine whether the additional dedicated data amount is needed when (e.g., after, concurrently with, etc.) user device 210 determines the allocation information.

In some implementations, user device 210 may determine whether the additional dedicated data amount is needed based on the allocation information. For example, as described above, user device 210 may determine whether the total amount of allocated dedicated data, associated with the allocation information, satisfies the allocation threshold. Here, if user device 210 determines that the total amount of allocated dedicated data satisfies the allocation threshold, then user device 210 may determine that the additional dedicated data amount is needed (e.g., in order to ensure that the total amount of allocated dedicated data, when compared to the dedicated data amount available to user device 210 plus the additional dedicated data amount, does not satisfy the allocation threshold). Alternatively, if user device 210 determines that the total amount of allocated dedicated data does not satisfy the threshold, then user device 210 may determine that the additional dedicated data amount is not needed.

As further shown in FIG. 5, if the additional dedicated data amount is not needed, then (block 520—NO), then process 500 may include storing the allocation information (block 530). For example, user device 210 may determine that the additional dedicated data amount is not needed, and user device 210 may store the allocation information. In some implementations, user device 210 may store the allocation information after user device 210 determines the allocation information. Additionally, or alternatively, user device 210 may store the allocation information when user device 210 determines that an additional dedicated data amount is not needed. Additionally, or alternatively, user device 210 may store the allocation information when user device 210 causes the additional dedicated data amount to be made available to user device 210, as described below.

In some implementations, user device 210 may store the allocation information in a memory location (e.g., a RAM, a ROM, a cache, a hard disk, etc.) of user device 210. In some implementations, user device 210 may store information associated with the allocation information such that previous allocation information (e.g., allocation information received by user device 210 at an earlier time) is supplemented, modified, overwritten, deleted, or the like. In some implementations, user device 210 may use the allocation information to determine dedicated data status information associated with user device 210, as described below.

Additionally, or alternatively, user device 210 may provide the allocation information to another device for storage. For example, user device 210 may provide the allocation information for storage by AAA 270. In some implementations, user device 210 may also provide information that identifies user device 210 (e.g., the MDN, the IMSI, etc.), the account (e.g., an account number, an account name, etc.), and/or the user of user device 210 (e.g., a username, a first and last name, etc.) along with the allocation information. This may allow AAA 270 to determine the allocation information, associated with user device 210 or the user, at a later time (e.g., based on the information that identifies user device 210 or the user).

As further shown in FIG. 5, if the additional dedicated data amount is needed (block 520—YES), then process 500 may include causing the additional dedicated data amount to be available to the user device (block 540). For example, user device 210 may determine that the additional dedicated data amount is needed, and user device 210 may cause the additional dedicated data amount to be available to the user device 210. In some implementations, user device 210 may cause the additional dedicated data amount to be made available to user device 210 when user device 210 determines that an additional dedicated data amount is needed.

In some implementations, user device 210 may cause the additional dedicated data amount to be available to user device 210 based on determining that an additional dedicated data amount is needed, as described above. For example, user device 210 may determine the total amount of allocated dedicated data satisfies the allocation threshold associated with the dedicated data amount available to user device 210. Here, user device 210 may provide, for display, a notification that the total amount of allocated dedicated data satisfies the allocation threshold, and user device 210 may prompt the user to provide input indicating whether the user wishes to purchase the additional dedicated data amount (e.g., such that the total amount of allocated dedicated data, when compared to the dedicated data amount available to user device 210 plus the additional dedicated data amount, does not satisfy the allocation threshold). In this example, if user device 210 determines that the user wishes to purchase the additional dedicated data amount, then user device 210 may provide, for display, one or more user interfaces that allow the user to provide input associated with making the additional dedicated data amount available to user device 210 (e.g., in a manner similar to that described above with regard to process 400). Here, upon receiving the user input, user device 210 may provide, to AAA 270, a request to make the additional dedicated data amount available to user device 210, and AAA 270 may make the additional dedicated data amount available to user device 210 based on the request (e.g., in a manner similar to that described above with regard to process 400). In some implementations, after causing the additional dedicated data amount to be available to user device 210, user device 210 may store the allocation information (i.e., process 500 may return to block 530).

Additionally, or alternatively, user device 210 may prompt the user to provide updated allocation information such that an updated total amount of allocated dedicated data does not satisfy the allocation threshold. For example, user device 210 may provide, for display, a notification that the total amount of allocated dedicated data satisfies the allocation threshold, and user device 210 may prompt the user to provide input indicating whether the user wishes to purchase the additional dedicated data amount. In this example, if user device 210 determines that the user does not wish to purchase the additional dedicated data amount, then user device 210 may prompt the user to provide updated allocation information. In other words, user device 210 may allow the user to provided updated allocation information such that the updated total amount of allocated dedicated data does not satisfy the allocation threshold. In some implementations, after determining the updated allocation information, user device 210 may store the updated allocation information (i.e., process 500 may return to block 530).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for providing dedicated data status information associated with a user device. In some implementations, one or more process blocks of FIG. 6 may be performed by user device 210. In some implementations, one or more process blocks of FIG. 6 may be performed by another device or a set of devices separate from or including user device 210, such as AAA 270 and/or one or more other devices of environment 200.

As shown in FIG. 6, process 600 may include receiving an indication to provide dedicated data status information associated with a user device (block 610). For example, user device 210 may receive an indication to provide dedicated data status information associated with user device 210. In some implementations, user device 210 may receive the indication when a user provides input indicating that user device 210 is to provide the dedicated data status information. Additionally, or alternatively, user device 210 may (e.g., automatically) receive the indication based on, for example, a configuration of user device 210. Additionally, or alternatively, user device 210 may receive the indication based on information provided by another device, such as AAA 270.

The dedicated data status information may include information that identifies an amount of dedicated data used by user device 210 with respect to an amount of allocated dedicated data associated with user device 210 and/or to an available to user device 210. For example, the dedicated data status information may include information indicating whether an amount of dedicated data used by user device 210 for an application is less than, equal to, greater than, within a threshold amount, or the like, of an amount of dedicated data allocated for use by the application on user device 210. In some implementations, the dedicated data status information may be associated with one or more applications and/or services. Additionally, or alternatively, the dedicated data status information may be associated with the dedicated data amount available to user device 210 (e.g., the dedicated data status information may be associated with a total amount of dedicated data used by user device 210).

In some implementations, user device 210 may receive the indication to determine the dedicated data status information based on user input. For example, the user of user device 210 may provide user input indicating that the user wishes to view the dedicated data status information (e.g., associated with one or more applications and/or services, associated with the dedicated data amount available to user device 210, etc.), and user device 210 may receive the indication, accordingly.

Additionally, or alternatively, user device 210 may receive the indication based on a configuration of user device 210. For example, user device 210 may be configured to automatically provide the dedicated data status information when user device 210 provides, for display, a user interface associated with one or more applications and/or services. As a particular example, user device 210 may be configured to provide the dedicated data status information when user device 210 provides, for display, a home screen that includes icons associated with one or more applications and/or services. Here, user device 210 may receive the indication based on determining the user device 210 is to provide, for display, the home screen.

As yet another example, user device 210 may be configured to provide the dedicated data status information when user device 210 receives (e.g., based on user input) an indication to execute an application and/or initiate a service. As still another example, user device 210 may be configured to provide the dedicated data status information at particular intervals of time (e.g., once a day, once a week, every day at 3:00 p.m., etc.), and user device 210 may receive the indication at the particular intervals of time.

Additionally, or alternatively, user device 210 may receive the indication based on information provided by another device. For example, AAA 270 may track and/or monitor an amount of dedicated data used by user device 210. Here, AAA 270 may determine that user device 210 has used an amount of dedicated data that satisfies a threshold (e.g., 1 GB, 50% of the dedicated data amount available to user device 210, etc.), and may provide the indication to user device 210.

As further shown in FIG. 6, process 600 may include identifying a dedicated data amount corresponding to the user device (block 620). For example, user device 210 may identify the amount of dedicated data available to user device 210 (i.e., the dedicated data amount made available to user device 210 via process 400). In some implementations, user device 210 may identify the dedicated data amount available to user device 210 when user device 210 receives the indication to provide the dedicated data status information.

In some implementations, user device 210 may identify the dedicated data amount available to user device 210 based on information stored or accessible by user device 210. For example, user device 210 may store information that identifies the dedicated data amount available to user device 210, and user device 210 may identify the dedicated data amount based on the stored information.

Additionally, or alternatively, user device 210 may identify the dedicated data amount available to user device 210 based on information provided by another device. For example, as described above, AAA 270 may store information associated with the dedicated data amount available to user device 210. In this example, user device 210 may provide, to AAA 270, a request for information that identifies the dedicated data amount available to user device 210, and may identify the dedicated data amount available to user device 210 based on a response provided by AAA 270.

As further shown in FIG. 6, process 600 may include determining allocation information associated with the user device (block 630). For example, user device 210 may determine the allocation information associated with user device 210. In some implementations, user device 210 may determine the allocation information when user device 210 receives the indication to provide the dedicated data status information. Additionally, or alternatively, user device 210 may determine the allocation information when (e.g., before, after, concurrently with) user device 210 identifies the dedicated data amount available to user device 210.

In some implementations, user device 210 may determine the allocation information based on information stored or accessible by user device 210. For example, user device 210 may store the allocation information, as described above, and user device 210 may determine the allocation information based on the stored information.

Additionally, or alternatively, user device 210 may determine the allocation information based on information provided by another device. For example, as described above, AAA 270 may store the allocation information. In this example, user device 210 may provide, to AAA 270, a request for the allocation information associated with user device 210, and may determine the allocation information based on a response provided by AAA 270.

As further shown in FIG. 6, process 600 may include determining dedicated data usage information associated with the user device (block 640). For example, user device 210 may determine dedicated data usage information associated with user device 210. In some implementations, user device 210 may determine the dedicated data usage information when user device 210 receives the indication to provide the dedicated data status information. Additionally, or alternatively, user device 210 may determine the dedicated data usage information when (e.g., before, after, concurrently with) user device 210 identifies the dedicated data amount available to user device 210. Additionally, or alternatively, user device 210 may determine the dedicated data usage information when user device 210 determines the allocation information associated with user device 210.

The dedicated data usage information may include information that identifies an amount of dedicated data used by user device 210. In some implementations, the dedicated data usage information may include information that identifies an amount of dedicated data used by user device 210 for an application and/or a service, an amount of dedicated data used by user device 210 for a set of applications and/or services, a total amount of dedicated data used by user device 210, or the like.

In some implementations, user device 210 may determine the dedicated data usage information based on information stored or accessible by user device 210. For example, assume that the allocation information indicates that an amount of dedicated data is to be used by user device 210 for sending and/or receiving data associated with an application. Here, when sending and/or receiving data associated with the application, user device 210 may track an amount of dedicated data used for the application. In other words, user device 210 may update and store a total amount of dedicated data used by the application. In this example, user device 210 may determine the dedicated data usage information, associated with the application, based on the stored information. In some implementations, user device 210 may track amounts of dedicated data used by one or more applications and/or services. In some implementations, user device 210 may track amounts of dedicated data used by one or more sets of applications and/or services (e.g., user device 210 may track dedicated data usage for a set of social media applications, a set of multimedia applications, a set of user specified applications, etc.). Additionally, or alternatively, user device 210 may track a total amount of dedicated data used by user device 210 (e.g., for all applications and/or services to which dedicated data is allocated).

Additionally, or alternatively, user device 210 may determine the dedicated data usage information based on information provided by another device. For example, AAA 270 may track dedicated data usage of user device 210 (in a manner similar to that described with regard to user device 210), and may store dedicated data usage information based on tracking the dedicated data usage of user device 210. In this example, user device 210 may provide, to AAA 270, a request for the dedicated data usage information associated with user device 210, and may determine the dedicated data usage information based on a response provided by AAA 270.

As further shown in FIG. 6, process 600 may include determining the dedicated data status information based on the dedicated data amount, the allocation information, and the dedicated data usage information (block 650). For example, user device 210 may determine the dedicated data status information based on the dedicated data amount, the allocation information, and the dedicated data usage information. In some implementations, user device 210 may determine the dedicated data status information after user device 210 identifies the dedicated data amount, determines the allocation information, and determines the dedicated data usage information.

In some implementations, user device 210 may determine the dedicated data status information by comparing the dedicated data usage information and the allocation information. For example, user device 210 may determine dedicated data usage information that indicates that user device 210 has used an amount of data for a sending and/or receiving data associated with an application. Here, user device 210 may identify, based on the allocation information, an amount of dedicated data allocated to the application, and may compare the amount of dedicated data used for the application to the amount of dedicated data allocated to the application.

In some implementations, user device 210 may determine dedicated data status information indicating that user device 210 has not used all of the dedicated data allocated to the application (e.g., when the amount of dedicated data used for the application is less than the amount of dedicated data allocated to the application). Alternatively, user device 210 may determine dedicated data status information indicating that user device 210 has used all of the dedicated data allocated to the application (e.g., when the amount of dedicated data used for the application is equal to or greater than the amount of dedicated data allocated to the application). Alternatively, user device 210 may determine dedicated data status information indicating that dedicated data usage, associated with the application, satisfies a threshold (e.g., 25% of dedicated data allocated to the application, 50% of dedicated data allocated to the application, 1 GB of dedicated data allocated to the application, etc.).

In some implementations, user device 210 may prevent user device 210 from sending and/or receiving data associated with the application based on the dedicated data status information. For example, if user device 210 determines that the amount of dedicated data used by user device 210 for sending and/or receiving data associated with the application is greater than or equal to the amount of dedicated data allocated to the application, then user device 210 may prevent user device 210 from sending and/or receiving any additional data associated with the application.

Additionally, or alternatively, user device 210 may cause data associated with the application sent and/or received at a later time to count against the shared data amount associated with the account (e.g., rather than the dedicated data amount available to user device 210). In some implementations, user device 210 may be configured on a per application basis whether to prevent user device 210 from sending and/or receiving data associated with the application or to cause the sent and/or received data, associated with the application, to count against the shared data amount associated with the account. In some implementations, user device 210 may prompt the user whether the user wishes to purchase an additional dedicated data amount based on preventing user device 210 from sending and/or receiving data associated with the application.

Additionally, or alternatively, user device 210 may determine the dedicated data status information by comparing the dedicated data usage information and the dedicated data amount available to user device 210. For example, user device 210 may determine dedicated data usage information that indicates a total amount of dedicated data used by user device 210 to send and/or receive information (e.g., for one or more applications and/or services). Here, user device 210 may compare the total amount of dedicated data used by user device 210 to the dedicated data amount available to user device 210.

In some implementations, user device 210 may determine dedicated data status information indicating that user device 210 has not used all of the dedicated data available to user device 210 (e.g., when the total amount of dedicated data used by user device 210 is less than the dedicated data amount available to user device 210). Alternatively, user device 210 may determine dedicated data status information indicating that user device 210 has used all of the dedicated data amount available to user device 210 (e.g., when the total amount of dedicated data used by user device 210 is equal to or greater than the dedicated data amount available to user device 210). Alternatively, user device 210 may determine dedicated data status information indicating that the total amount of dedicated data used by user device 210 satisfies a threshold (e.g., 25% of the dedicated data amount, 90% of the dedicated data amount, 1 GB of the dedicated data amount, etc.).

In some implementations, user device 210 may determine dedicated data status information associated with one or more applications and/or services, one or more sets of applications and/or services, and/or the dedicated data amount available to user device 210.

As further shown in FIG. 6, process 600 may include providing the dedicated data status information (block 660). For example, user device 210 may provide the dedicated data status information. In some implementations, user device 210 may provide the dedicated data status information after user device 210 determines the dedicated data status information. Additionally, or alternatively, user device 210 may provide the dedicated data status information when user device 210 receives information indicating that user device 210 is to provide the dedicated data status information from another device, such as AAA 270.

In some implementations, user device 210 may provide the dedicated data status information for display to the user. For example, user device 210 may provide, for display, one or more symbols corresponding to the dedicated data status information, such as one or more symbols (e.g., thumbs up, thumbs down, a check mark, an "X", etc.), shapes (e.g., circles, squares, triangles, etc.), colors, usage meters, graphs, or the like.

As an example, user device 210 may provide, for display on or near an icon associated with an application, a colored circle corresponding to the dedicated data status information associated with the application. In this example, a green circle displayed on or near the icon may indicate that the amount of dedicated data used by the application satisfies a first threshold (e.g., less than or equal to 75% of dedicated data allocated to the application), a yellow circle may indicate that the amount of dedicated data used by the application satisfies a second threshold (e.g., greater than 75% and less than or equal to 95% of dedicated data allocated to the application), a red circle may indicate that the dedicated data amount used by the application satisfies a third threshold (e.g., greater than 95% and less than 100% of dedicated data allocated to the application), and a black circle may indicate that the dedicated data amount used by the application is equal to or greater than the amount of dedicated dedicated allocated to the application.

In some implementations, user device 210 may also provide, for display, a symbol indication that no dedicated data has been allocated to an application and/or a service. Continuing with the above example, user device 210 may provide, for display on or near an icon associated with an application, a white circle to indicate that no dedicated data is allocated to the application (i.e., that the application will use shared data associated with the account).

In some implementations, the user may interact with a symbol corresponding to an application and/or service in order to provide updated allocation information and/or to cause an additional amount of dedicated data to be available to user device 210. For example, the user may select (e.g., by touching via a touchscreen) the symbol associated with the application, and user device 210 may provide a user interface that allows the user to provide updated allocation information associated with the application (e.g., such that the user may increase or decrease the amount of dedicated data allocated to the application). In some implementations, user device 210 may receive and store the updated allocation information, as described above. Additionally, or alternatively, user device 210 may determine, based on the updated allocation information, whether an additional dedicated data amount is needed (e.g., when the user wishes to increase an amount of dedicated data allocated to an application and/or a service), and may allow the user to purchase the additional dedicated data amount, as described above.

As another example, user device 210 may provide, for display, a usage meter that identifies the total amount of dedicated data used by user device 210 (e.g., for all applications and/or services) as compared to the dedicated data amount available to user device 210. In some implementations, user device 210 may display the usage meter, associated with the dedicated data, and a usage meter associated with shared data associated with the account.

Additionally, or alternatively, user device 210 may provide the dedicated data status information to another device. For example, user device 210 may provide the dedicated data status information to another device of environment 200, such as AAA 270 (e.g., such that AAA 270 may monitor and/or track dedicated data usage associated with user device 210). In some implementations, user device 210 may receive a notification (e.g., a text message, an automated phone call, etc.) when a data usage threshold is satisfied.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein may allow a dedicated data amount to be made available to a user device of a set of user devices associated with an account. In some implementations, the dedicated data amount may be used exclusively by the user device (e.g., rather than by all user devices of the set of user devices associated with the account, as with shared data). Implementations described herein may also allow the user device to allocate and/or monitor dedicated data usage of the user device (e.g., on a per-application and/or a per-service basis).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
a memory to store instructions; and
one or more processors to execute the instructions to:
identify an amount of data corresponding to the user device,
the user device being one of a plurality of user devices associated with an account with a shared data amount,
the amount of data corresponding to the user device including a first amount of data that is available for use by the user device and that is not available for use by other user devices of the plurality of user devices, and
the shared data amount including a second amount of data that is available for use by all of the plurality of user devices and not allotted to any specific user device of the plurality of user devices;
determine allocation information associated with the amount of data corresponding to the user device,
the allocation information identifying a portion of the amount of data corresponding to the user device that is allocated for use in association with an application;
determine data usage information associated with the application,
the data usage information identifying an amount of data used in association with the application;
determine data status information based on the allocation information and the data usage information,
the data status information indicating that the amount of data used in association with the application is equal to or greater than the portion of the amount of data corresponding to the user device that is allocated for use in association with the application;
provide, via a display, information based on the amount of data used in association with the application, the data status information; and
cause, based on the data status information, the data, associated with the application, to count against the shared data amount, when the amount of data used in association with the application is equal to or greater than the portion of the amount of data corresponding to the user device that is allocated for use in association with the application.

2. The user device of claim 1, where the one or more processors further execute instructions to:
receive user input that identifies the amount of data corresponding to the user device; and
provide a request associated with the amount of data corresponding to the user device,
the request being provided to cause the amount of data corresponding to the user device to be made available to the user device.

3. The user device of claim 2, where the request includes information associated with causing the first amount of data to be made available to the user device,
the information including at least one of:
information that identifies the user device,
information that identifies the account,
information that identifies a user of the user device, or
information that identifies the first amount of data.

4. The user device of claim 2, where the request is provided to another device.

5. The user device of claim 1, where the one or more processors, when determining the data status information, execute instructions to:
determine that a difference between the amount of data used in association with the application and the portion of the amount of data available to the user device that is allocated for use in association with the application satisfies a threshold; and
determine the data status information based on determining that the difference satisfies the threshold.

6. The user device of claim 1, where the display indicates whether the amount of data used in association with the application is less than the portion of the amount of data corresponding to the user device that is available to the user device that is allocated for use in association with the application.

7. The user device of claim 1, where the one or more processors further execute instructions to:
determine a total amount of data used in association with a plurality of applications, the plurality of applications including the application; and
where the one or more processors, when providing the data status information, are to:
provide information associated with the total amount of data used in association with the plurality of applications.

8. The user device of claim 1, where the one or more processors further execute instructions to:
receive an indication to provide the data status information,
the indication being automatically received based on a configuration of the user device; and
provide the data status information based on receiving the indication.

9. A non-transitory computer-readable medium storing instructions, the instructions comprising:
one or more instructions that, when executed by one or more processors, cause the one or more processors to:

identify an amount of data corresponding to a user
device associated with an account with a shared data
amount,
the user device being included in a plurality of user
devices associated with the account,
the amount of data corresponding to the user device
being a first amount of data that is available for use
by the user device and that is unavailable for use
by other user devices of the plurality of user
devices, and
the shared data amount including a second amount of
data that is available for use by all of the plurality
of user devices and not allotted to any specific user
device of the plurality of user devices;
determine allocation information associated with the
amount of data corresponding to the user device,
the allocation information identifying a portion of
the amount of data corresponding to the user
device that is to be used to send or receive data
associated with an application;
determine data usage information associated with the
application,
the data usage information identifying an amount of
data used to send or receive data associated with
the application;
determine data status information based on the allocation information and the data usage information,
the data status information indicating that the amount
of data used to send or receive data associated
with the application is equal to or greater than the
portion of the amount of data corresponding to the
user device that is to be used to send or receive
data associated with the application;
provide, for display and via a symbol that displays
information that changes based on the amount of
data used in association with the application, the data
status information; and
cause, based on the data status information indicating
that the amount of data used in association with the
application is equal to or greater than the portion of
the amount of data corresponding to the user device
that is allocated for use in association with the
application, the data, associated with the application,
to count against the shared data amount.

10. The non-transitory computer-readable medium of claim 9, where the one or more instructions, when executed by the one or more processors, further cause the one or more processors to:
receive information that identifies the amount of data
corresponding to the user device; and
cause the amount of data corresponding to the user device
to be made available for use by the user device.

11. The non-transitory computer-readable medium of claim 10, where the one or more instructions, that cause the one or more processors to cause the amount of data corresponding to the user device to be made available for use by the user device, cause the one or more processors to:
provide a request to another device to cause the amount of
data corresponding to the user device to be made
available by the other device for use by the user device.

12. The non-transitory computer-readable medium of claim 9, where the one or more instructions, that cause the one or more processors to determine the data status information, cause the one or more processors to:
determine that a difference between the amount of data
used to send or receive data associated with the application and the portion of the amount of data that is to
be used to send or receive data associated with the
application satisfies a threshold; and
determine the data status information based on determining that the difference satisfies the threshold.

13. The non-transitory computer-readable medium of claim 9, where the one or more instructions, that cause the one or more processors to provide the data status information, cause the one or more processors to:
provide, for display, the data status information,
the data status information indicating whether the
amount of data used to send or receive data associated with the application is less than, equal to, or
greater than the portion of the amount of data corresponding to the user device.

14. The non-transitory computer-readable medium of claim 9, where the one or more instructions, when executed by the one or more processors, further cause the one or more processors to:
determine a total amount of data used to send or receive
data associated with a plurality of applications,
the plurality of applications including the application;
and
where the one or more instructions, that cause the one or
more processors to provide the data status information,
cause the one or more processors to:
provide information associated with the total amount of
data to send or receive data associated with the
plurality of applications.

15. The non-transitory computer-readable medium of claim 9, where the one or more instructions, when executed by the one or more processors, further cause the one or more processors to:
receive an indication to provide the data status information,
the indication being received based on user input; and
provide the data status information based on receiving the
indication.

16. A method, comprising:
identifying, by a device, a first amount of data corresponding to a user device,
the user device being one of a plurality of user devices
associated with a service provider account with a
shared data amount,
the first amount of data being an amount of data that is
available for use by the user device that is unavailable for use by other user devices of the plurality of
user devices, and
the shared data amount including an amount of data
that is available for use by all of the plurality of user
devices and not allotted to any specific user device of
the plurality of user devices;
determining, by the device, allocation information associated with the first amount of data,
the allocation information identifying a second amount
of data that is to be used in association with an
application,
the second amount of data being less than the first
amount of data;
determining, by the device, usage information, associated
with the application, that identifies a third amount of
data,
the third amount of data being data used in association
with the application and counting against the first
amount of data;
determining, by the device, status information based on
the allocation information and the usage information, the status information indicating that the third amount of data is equal to or greater than the second amount of data;

providing, by the device via a display, information that changes based on the amount of data used in association with the application, the status information; and causing, based on the status information indicating that the third amount of data is equal to or greater than the second amount of data, the data, associated with the application, to count against the shared data amount.

17. The method of claim 16, further comprising:

receiving information that identifies the first amount of data; and causing the first amount of data to be made available for use by the user device.

18. The method of claim 16, where determining the status information comprises:

determining that a difference between the second amount of data and the third amount of data satisfies a threshold; and determining the status information based on determining that the difference satisfies the threshold.

19. The method of claim 16, where providing the status information comprises:

providing, for display, the status information, the status information indicating whether the third amount of data is less than the second amount of data.

20. The method of claim 16, further comprising:

determining a total amount of data used in association with a plurality of applications, the plurality of applications including the application; and where providing the status information comprises:

providing information associated with the total amount of data used in association with the plurality of applications.

\* \* \* \* \*